Figure 2:
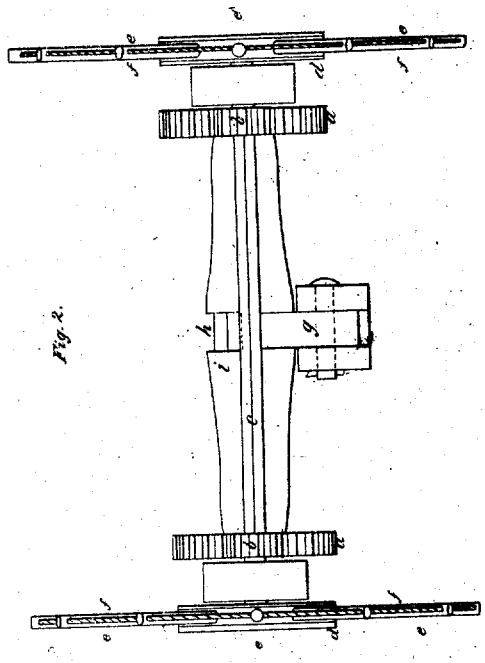
Figure 1:
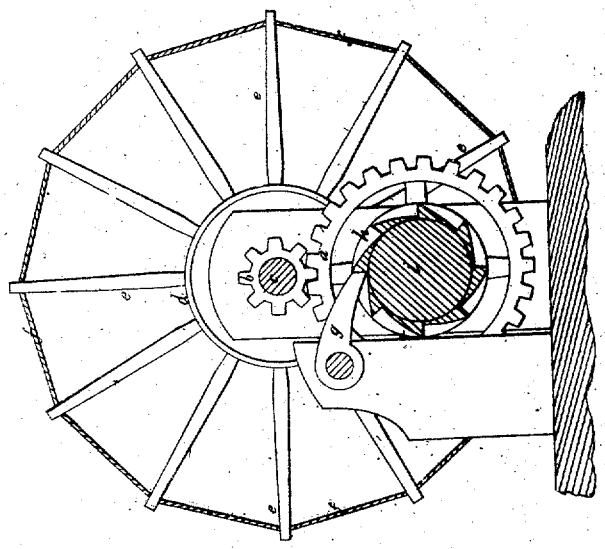

1388X

J. Galvin.

Windlass.

Patented Nov. 6, 1810.

1388X

John Galvin
Letters Patent, dated November 6th 1810.

The Schedule referred to in these Letters Patent and making part of the sa[illegible]
containing a description in the words of the said John Galvin himself, of his [illegible]
provement in the Windlass and Capstan.

This Machine is intended to supersede the common mode of weighing Anc[illegible]
it has two different powers, either of which may be employed as circumstances shoul[illegible]
require.

On each end of the Windlass place a Cog-wheel of Iron, say about 40 inches [illegible]
ameter above each place another Cogwheel of Iron say 13 inches [illegible]/10 or one third o[illegible]
the first. This power is as two to six hand spikes or two men can heave as much as six [illegible]
handspikes by the usual method, and it is calculated for all common uses.

A second power may [illegible] to by having also on the upper axis a smaller [illegible]
cogwheel, say 10 inches or [illegible] of the main cog wheel this may be used in extraordinary occa[illegible]
When the anchor has a heavy hold in the ground, or when blowing fresh and wanting to hea[illegible]
a head, or get under weigh; it is as two to eight hand spikes, and by double or treble mann[illegible]
the power is increased to a two fold or treble proportion, it is also of the utmost importance
in case of getting a ground, as the power may be carried to any extent the machine or corda[illegible]
is capable of sustaining.

The axis on which the smaller cog-wheels are placed, is turned by a vertical dru[illegible]
head similar to the common Capstan, the bars are secured by a swifter and may be in a[illegible]
number proportioned to the size of the Vessel, say from 8 to 12. The windlass is prevented runn[illegible]
back or losing what is gained by a ratchet wheel and pells the same as in common use.
N.B. The endless screw may be substituted for the propelling cog-wheels which it is wi[illegible]
and required to make a part of the patent tho it is not shown in the accompanying
drawings. A Capstan may be made on the same principles, only operating horizo[illegible]
tally, instead of vertically.

Witnesses
William Thornton
Thomas Peter

John Galvin
Drawing made by [illegible] [illegible]

Exd. W.H.

[illegible]

I assign my right and title to the within Patent that is to say that James Smallman has purchased it for a certain sum for value received. Given under my han[d]
this 5th day of June in the year of our Lord 1811.

Witness present
Hugh Tearny

John Galvin (Sea[l])

I Clement Biddle, Notary Public for the Commonwealth of Pennsylvan[ia]
duly commissioned and authorized, residing in the City of Philadelphia, Do hereby
certify, on this tenth day of October in the year of our Lord one thousand eight hun-
dred and ten, that the annexed writing is a just & true Copy of an original Pate[nt]
granted by his Excellency James Madison President of the United States under his
hand and the Seal of the said United States & Countersigned by the Honorable Ro[b-]
ert Smith Secretary of State and Cæsar A. Rodney Esquire Attorney General of the
said United States, and also of the Schedule thereunto annexed Signed by John Phill[ips]
& James Smallman, which I have compared & found to agree therewith.

L.S.

In testimony whereof I have hereunto set my hand & affixed
my Notarial Seal

Clement Biddle
No. Pub.

1388x